US012095967B2

(12) United States Patent
Abhishek et al.

(10) Patent No.: US 12,095,967 B2
(45) Date of Patent: Sep. 17, 2024

(54) BITSTREAM STRUCTURE FOR IMMERSIVE TELECONFERENCING AND TELEPRESENCE FOR REMOTE TERMINALS

(71) Applicant: TENCENT AMERICA LLC, Palo Alto, CA (US)

(72) Inventors: Rohit Abhishek, San Jose, CA (US); Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/204,984

(22) Filed: Jun. 2, 2023

(65) Prior Publication Data

US 2023/0308625 A1    Sep. 28, 2023

Related U.S. Application Data

(63) Continuation of application No. 17/362,068, filed on Jun. 29, 2021, now Pat. No. 11,743,442.

(Continued)

(51) Int. Cl.
*H04N 13/161* (2018.01)
*G06F 3/01* (2006.01)
(Continued)

(52) U.S. Cl.
CPC ......... *H04N 13/161* (2018.05); *G06F 3/012* (2013.01); *H04L 65/65* (2022.05); *H04N 13/111* (2018.05); *H04N 19/597* (2014.11)

(58) Field of Classification Search
None
See application file for complete search history.

(56) References Cited

U.S. PATENT DOCUMENTS

| 10,356,387 B1 | 7/2019 | Phillips et al. |
| 2018/0270486 A1 | 9/2018 | Liu et al. |

(Continued)

FOREIGN PATENT DOCUMENTS

| EP | 3 672 251 A1 | 6/2020 |
| JP | 2020-516122 A | 5/2020 |
| WO | 2019/183217 A1 | 9/2019 |

OTHER PUBLICATIONS

European Office Action dated Dec. 19, 2023 in European Application No. 21889775.9.

(Continued)

*Primary Examiner* — Christopher Braniff
(74) *Attorney, Agent, or Firm* — Sughrue Mion, PLLC

(57) ABSTRACT

A method of decoding viewport bitstreams includes decoding first video content; transmitting, information about (i) a speed of a user's head movement while viewing the first video content and (ii) an available bandwidth; receiving a streaming bitstream that includes (i) a first coded video bitstream having a segment size defined for a viewport based on the available bandwidth and a head speed threshold corresponding to the speed of the user's head movement such that the segment size is inversely proportional to the speed of the user's head movement, the first coded video bitstream having a first resolution, and (ii) a second coded video bitstream having a second resolution corresponding to a background having a constant segment duration or size, the second resolution being lower than the first resolution; and rendering second video content using the first coded video bitstream and the second coded video bitstream.

20 Claims, 9 Drawing Sheets

Related U.S. Application Data

(60) Provisional application No. 63/111,425, filed on Nov. 9, 2020.

(51) Int. Cl.
    *H04L 65/65*    (2022.01)
    *H04N 13/111*   (2018.01)
    *H04N 19/597*   (2014.01)

(56) References Cited

U.S. PATENT DOCUMENTS

| | | |
|---|---|---|
| 2019/0230142 A1 | 7/2019 | He et al. |
| 2020/0107003 A1 | 4/2020 | Phillips et al. |
| 2020/0177927 A1 | 6/2020 | Yang et al. |
| 2020/0396436 A1 | 12/2020 | Bruls et al. |

OTHER PUBLICATIONS

Japanese Office Action dated Sep. 4, 2023 in Application No. 2022-555688.
International Search Report dated Nov. 2, 2021, issued by the International Searching Authority in application No. PCT/US2021/044902.
Extended European Search Report issued Mar. 21, 2023 in European Application No. 21889775.9.
Written Opinion dated Nov. 2, 2021, issued by the International Searching Authority in application No. PCT/US2021/044902.
"ITT4RT Permanent Document—Requirements, Working Assumptions and Potential Solutions", Intel Nokia Corporation (ITT4RT Co-Rapporteurs), 3GPP TSG-SA4 Meeting #109e, May 20-Jun. 3, 2020, pp. 1-44.

BITSTREAM STRUCTURE FOR IMMERSIVE TELECONFERENCING AND TELEPRESENCE FOR REMOTE TERMINALS

CROSS REFERENCE TO RELATED APPLICATION

This application claims priority based on U.S. application Ser. No. 17/362,068, filed Jun. 29, 2021, which claims priority based on U.S. Provisional Application No. 63/111,425, filed Nov. 9, 2020, the entirety of each of which are incorporated by reference herein.

BACKGROUND

This disclosure relates generally to field of data processing, and more particularly to video streaming.

Immersive video streaming involved the transmission of a "world" or "omnidirectional" view from a sender to a receiver, and the receiver would render only parts of the received world-view based on, for example a viewport. The viewport can be selected based on direction of head movement when wearing virtual reality goggles. Viewport-dependent video streaming can relate to techniques where, out of a scene that was recorded covering a "world" view, only a portion of that view is being transmitted and rendered to the user based on the viewport the user has selected.

SUMMARY

Embodiments relate to a method, system, and computer readable medium for splitting viewport bitstreams. According to one aspect, a method for splitting viewport bitstreams is provided. The method may include encoding a first coded video bitstream having a segment size defined for a viewport based on a threshold corresponding to a user's head movement. A second coded video bitstream having a low resolution is encoded. The second coded video bitstream may correspond to a background having a constant segment duration or size. A streaming bitstream for decoding or rendering is created using the first coded video bitstream and the second coded bitstream.

According to another aspect, a computer system for splitting viewport bitstreams is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include encoding a first coded video bitstream having a segment size defined for a viewport based on a threshold corresponding to a user's head movement. A second coded video bitstream having a low resolution is encoded. The second coded video bitstream may correspond to a background having a constant segment duration or size. A streaming bitstream for decoding or rendering is created using the first coded video bitstream and the second coded bitstream.

According to yet another aspect, a computer readable medium for splitting viewport bitstreams is provided. The computer readable medium may include one or more computer-readable storage devices and program instructions stored on at least one of the one or more tangible storage devices, the program instructions executable by a processor. The program instructions are executable by a processor for performing a method that may accordingly include encoding a first coded video bitstream having a segment size defined for a viewport based on a threshold corresponding to a user's head movement. A second coded video bitstream having a low resolution is encoded. The second coded video bitstream may correspond to a background having a constant segment duration or size. A streaming bitstream for decoding or rendering is created using the first coded video bitstream and the second coded bitstream.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
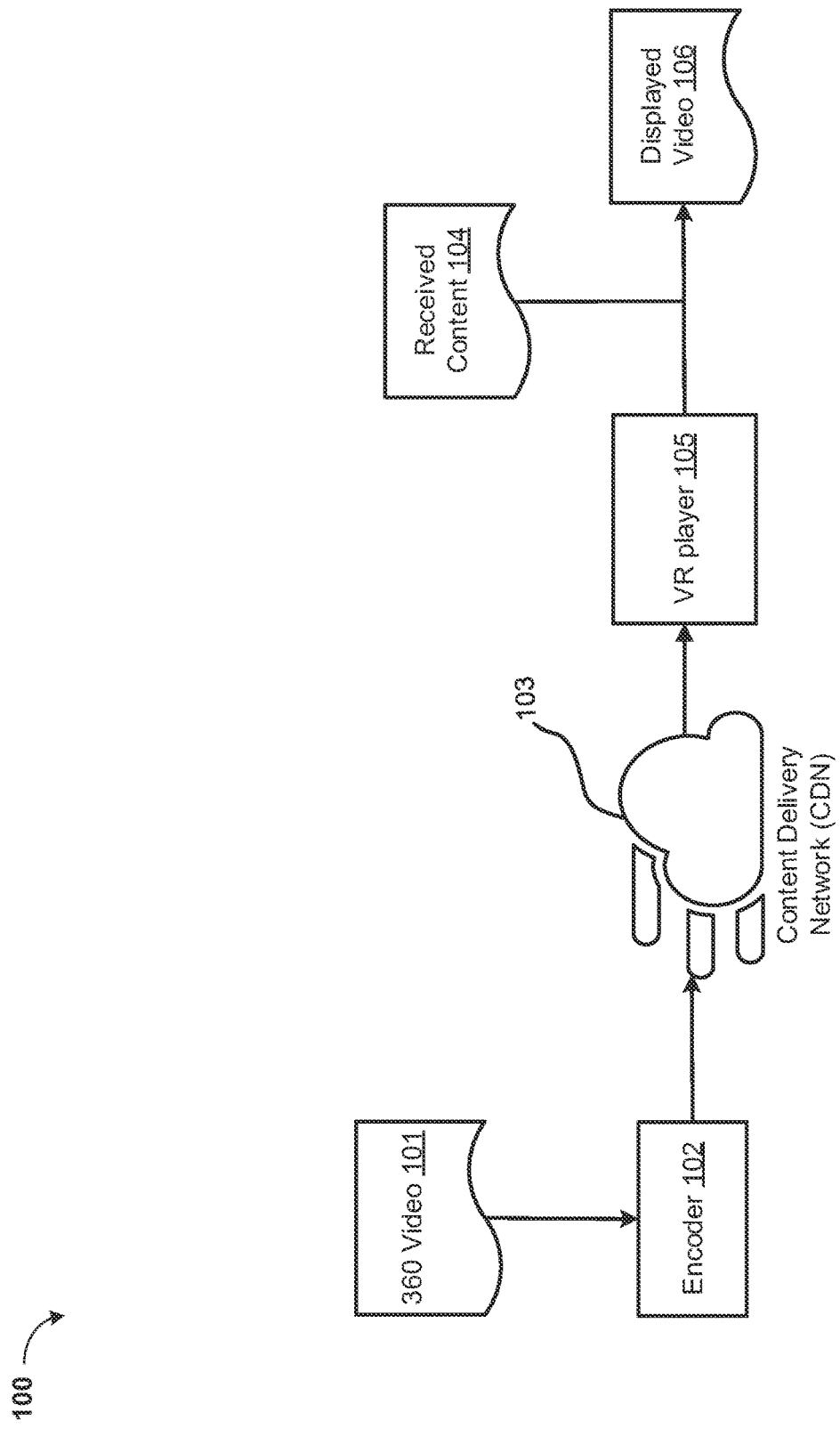
FIG. 1 is a schematic illustration of the ecosystem for streaming a immersive video, according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to video streaming. The following described exemplary embodiments provide a system, method and computer program for, among other things, viewport-based video streaming. Therefore, some embodiments have the capacity to improve the field of computing by allowing for the splitting of a viewport bitstream into smaller fragmented files or segments of DASH and provide fallback bitstream fragments or segments for supporting fast bitstream random-access in playback.

As previously described, immersive video streaming involved the transmission of a "world" or "omnidirectional" view from a sender to a receiver, and the receiver would render only parts of the received world-view based on, for example a viewport. The viewport can be selected based on direction of head movement when wearing virtual reality goggles. Viewport-dependent video streaming can relate to techniques where, out of a scene that was recorded covering a "world" view, only a portion of that view is being transmitted and rendered to the user based on the viewport the user has selected.

However, as the rate at which a user moves his/her head increases, the request for new tiles increases as well, thereby increasing M2HQ delay. Additionally, a lot of data which is downloaded, is not viewed by the user, hence wasted. It may be advantageous, therefore, to reduce the latency incurred when the viewport is changed in immersive video by restructuring the bitstream.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

The following described exemplary embodiments provide a system, method and computer program that relates to viewport-based video streaming, and more specifically to the bitstream structure for viewport for immersive teleconferencing and telepresence for remote terminals when the viewport of the user changes, by using variable bitstream segments size.

FIG. 1 illustrates a block diagram of an ecosystem 100 for streaming a immersive video. A 360 video (101) is passed through an encoder (102) and the entire picture is streamed over content delivery network (CDN) (103). The user decodes and reconstructs the received content (104) in the VR player (105). The downside of sending the entire picture is a waste of bandwidth and rendering resources since user's field-of-view (FoV) (106) at any given time only falls in to a contain degree. The bitstream which is out of the user's current FoV may not be viewed and is received and rendered by the client anyway. The viewport selection can, for example, be based on direction of head movement when wearing virtual reality goggles. Viewport-dependent video streaming can relate to techniques where, out of a scene that was recorded covering a "world" view, only a portion of that view is being transmitted and rendered to the user based on the viewport the user has selected, thereby eliminating the need to transmit the whole world-view.

Figure 2:
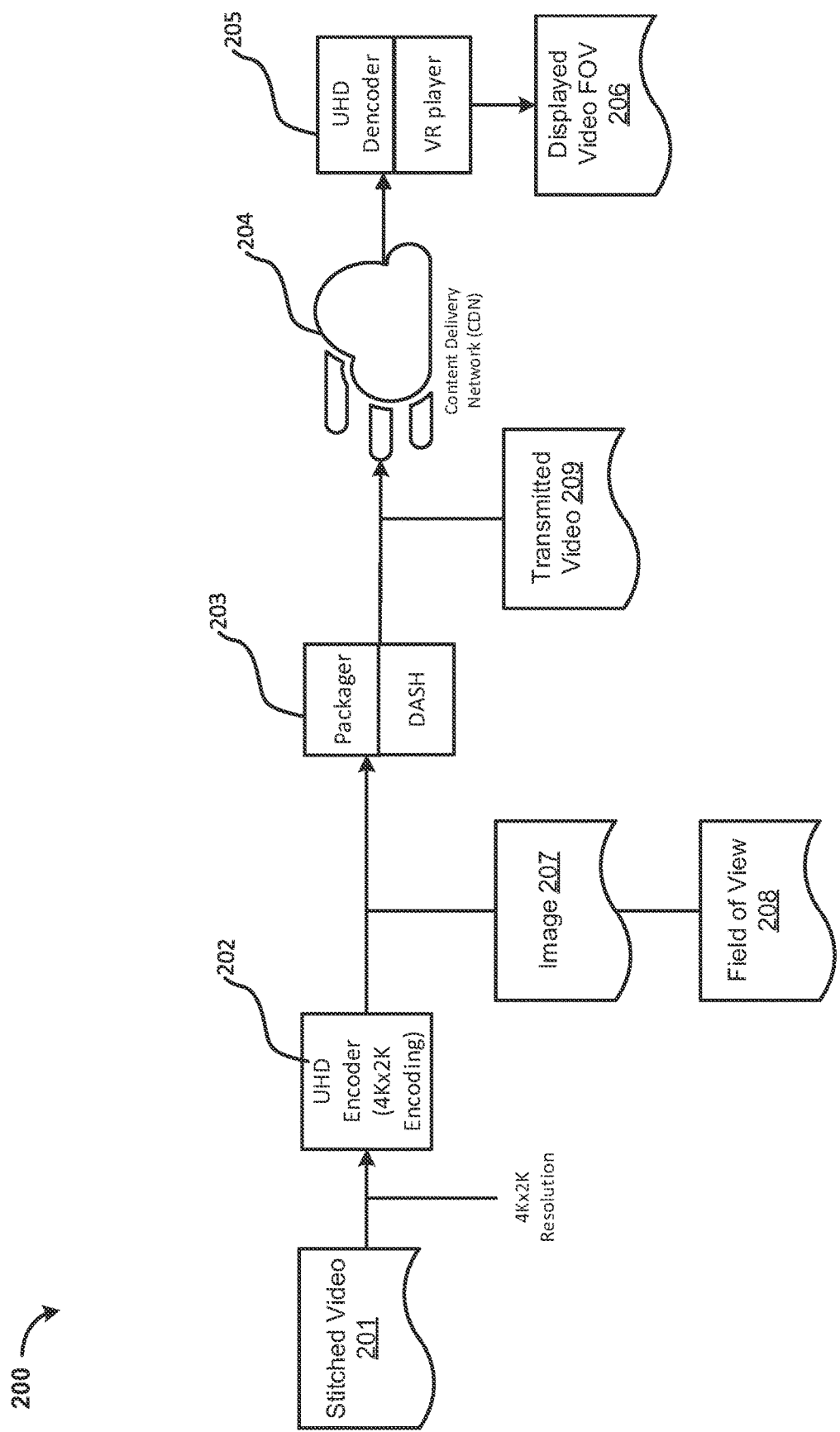
FIG. 2 is a schematic illustration of a viewport based streaming workflow of a immersive video, according to at least one embodiment.

Tile(or subpicture)-based immersive video streaming technology can be used to reduce the bandwidth requirements and improve the video quality of video playback. Referring to FIG. 2, a block diagram of a 360 viewport-dependent video streaming system 200 is depicted. A 360 video scene (201) is encoded by using a planar video encoder (202) after the video scene has been appropriately stitched and projected into a flat video using, for example, the equirectangular or cubemap projection.

In order to use a coded video bitstream over DASH, the sequence can be put into a file with a format that splits the bitstream into a sequence of smaller HTTP-based video bitstream segments. Those video files may have different bitrate and durations. They may be transmitted through an IP network and independently decodable in a client side.

An encoded immersive video may be fragmented by a DASH packager (203) as described above. The fragmented content may be saved in a content-delivery server (not depicted) and conveyed by a CDN (204), to a compatible player (205) for rendering (206). Here the transmitted video (209) consists only of high-resolution FoV (208) instead of sending the entire picture (207). At the receiver side, the 4K picture is decoded and reconstructed in the player.

Tile based streaming spatially partitions the 360 video frames into multiple tiles or blocks. Here, the panoramic video is encoded and divided into tiles after the compression state. The user then requests only the tiles that fall fully or partially into the user's field of view (FOV). By splitting large immersive video bitstream pictures into smaller fragments or tiles and transmit fragments or tiles which falls into user's FOV may save network and rendering side resources.

A large immersive content (after projection, i.e. the flat video stream) may be spatially subdivided into tiles of, for example the same resolution. For example, a source picture of a 4k×2k video sequence may be split into equally sized tiles of 512×156 samples, resulting in 64 tiles. Each tile may encoded and packaged at different bitrates and quality levels (as common in DASH), and may be requested at a quality different from its neighboring tile. The tiles in the user's viewport may be prioritized and advantageously streamed at a higher quality than tiles outside the viewport. In some cases, certain tiles may be omitted from transmission entirely. As a fallback, an extra layer with, for example a lower resolutions/quality/bitrate covering the entire panorama may be used. Assuming an appropriate player design, doing so may prevent visual artifacts, for example, black areas, when the FoV changes but the new tiles are not immediately available due to network/streaming server delay.

The resolution of the tiles may be changed when the user moves his/her head, but, for example only at random-access points (RAPs). A RAP can be an access unit at which the receiver can successfully start decoding the tile or video. The picture frames may be grouped together in a different GOP (Group of pictures) sizes. I-frames may be followed by P-frames which may contain a coded representation of the changes of the preceding frame. Therefore, P-frames are dependent on the I-frames and earlier P-frames. GOP structures are used in typical encoders which causes each I frame to be a random-access point such that decoding can start on an I frame. Therefore, the response time needed for the tile to be changed depends on the tile granularity and RAP distance. When the user's orientation changes, the tiles currently in viewport may need (at least partially) to be replaced by different tiles. These new tiles may only be switched at the next available RAP, resulting in a delayed reaction to user input.

Figure 3:
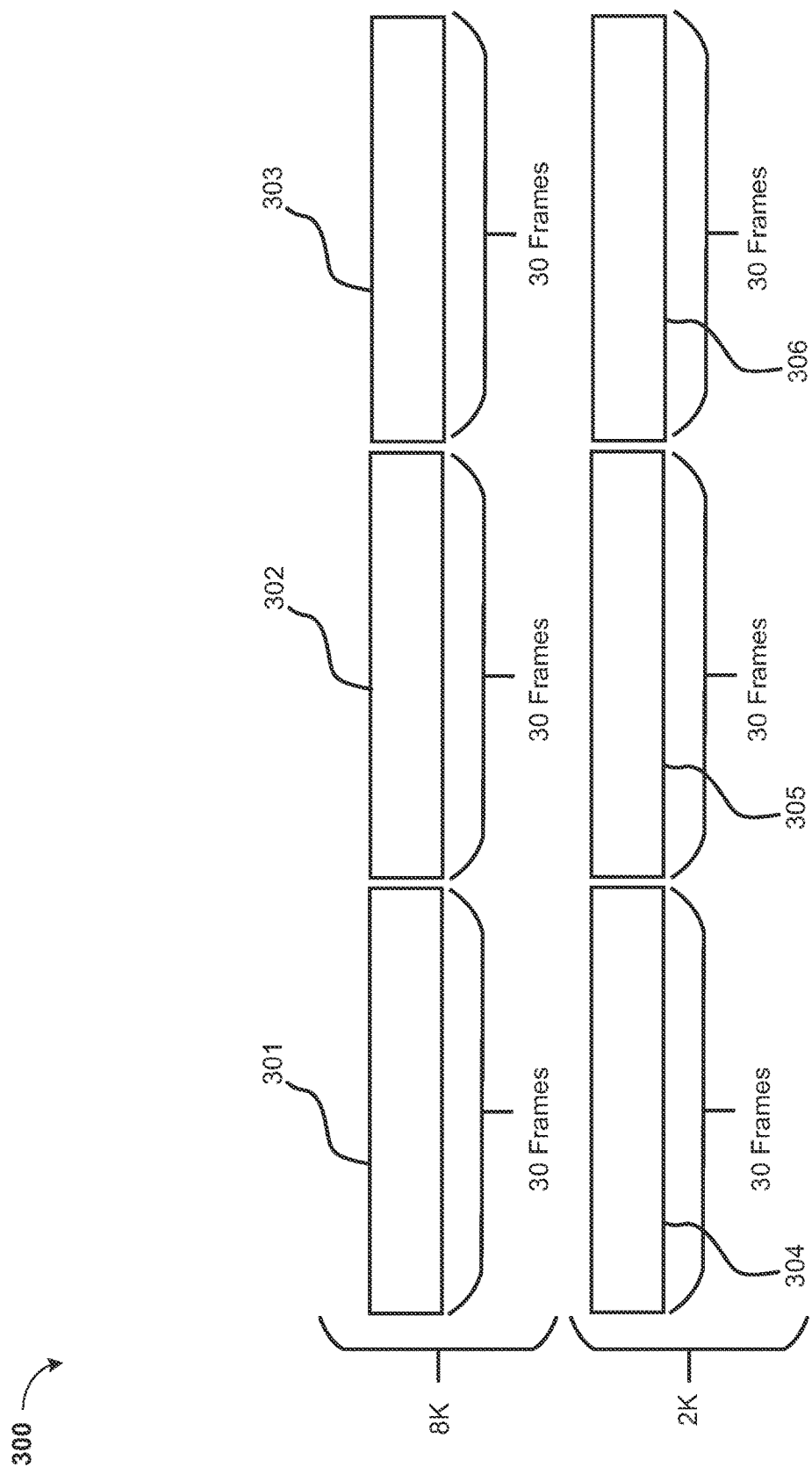
FIG. 3 is a schematic illustration of fragmented immersive video bitstreams with a frame boundary, according to at least one embodiment.

Referring now to FIG. 3, a block diagram 300 of fragmented immersive video bitstreams with a frame boundary embodiment is depicted. For example, an 8k (301-303) and 2k (304-306) resolution video bitstream may be contained within a representation of the same projected scene. The low resolution (304-306) can be used as a fallback when changing the FoV, and may be streamed continuously. The high resolution (301-303) may be a tiled representation and may be used for viewport independent streaming as described above. Both streams may have the equal frame count and may be split into equal fixed-frame fragments, which may consist of a random-access point period of 30 frames. Only certain tiles of the 8K resolution are delivered as required to cover the FoV, while the entire frame with 2K resolution is delivered as fallback. RAPs may be present in each bitstream once every 1 second assuming a fixed 30 fps frame rate.

While such a configuration may allow visually pleasing fast reactions by the render using the reconstructed fallback bitstream in case of FoV change, the issue remains that on average 15 frames of high resolution tiles are being sent at each FoV change that are useless, as they may not be rendered due to the changed FoV.

Figure 4:
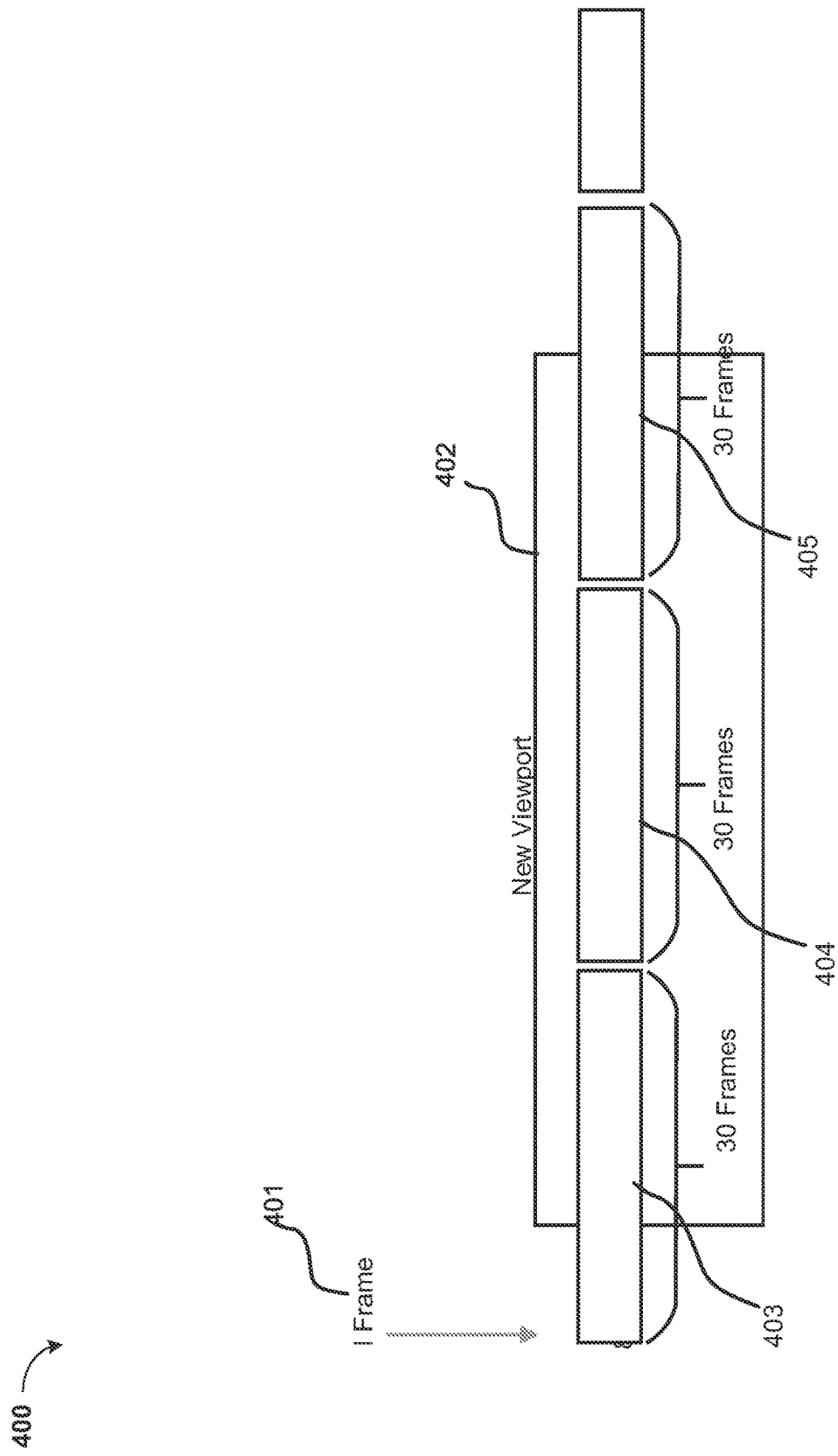
FIG. 4 is a schematic illustration of viewport update during immersive bitstream playback with a frame boundary, according to at least one embodiment.
Figure 5:
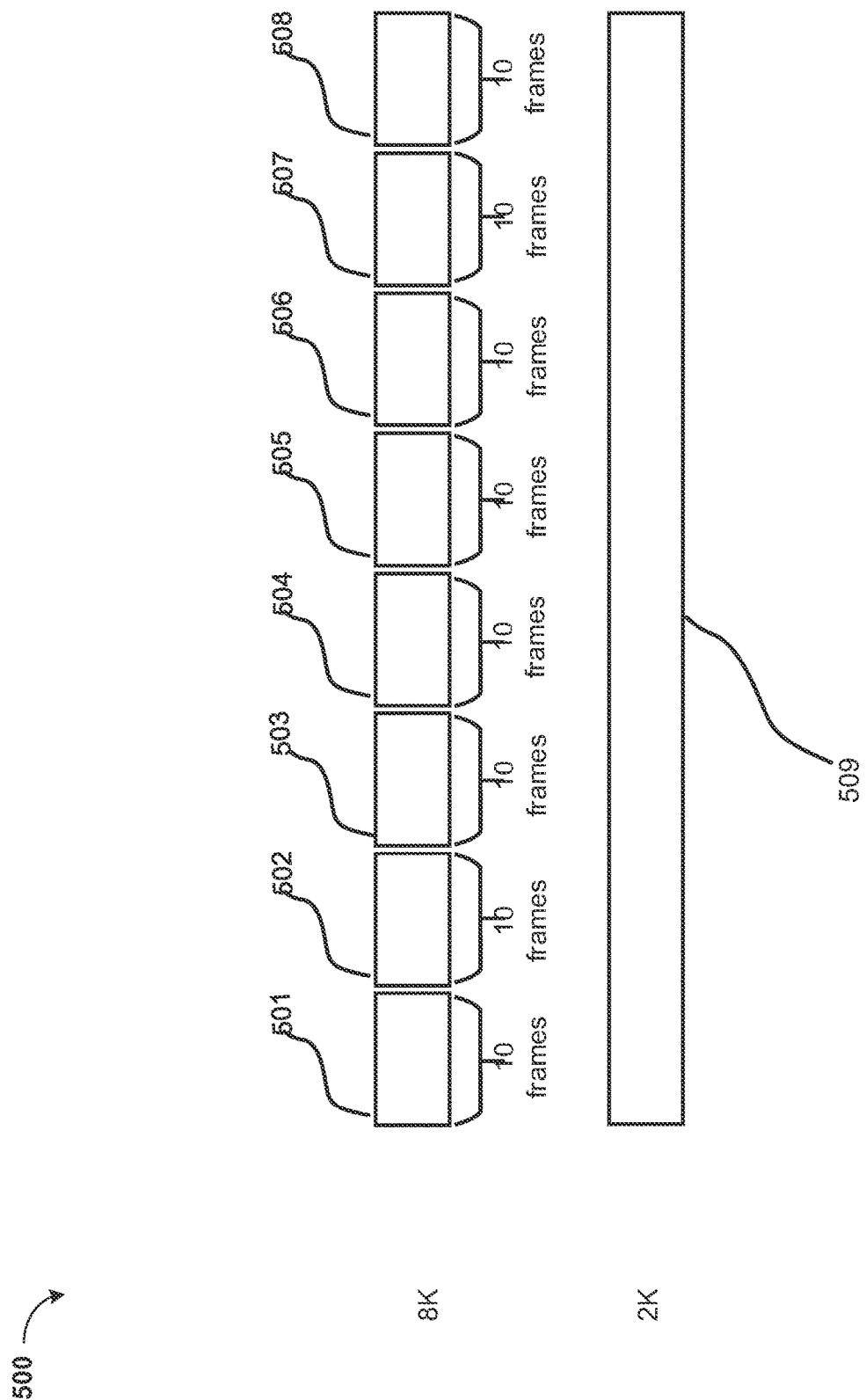
FIG. 5 is a schematic illustration of 8K and 2k immersive bitstream fragmentations with a frame boundary, according to at least one embodiment.

Referring to FIG. 4, a block diagram 400 of viewport update during immersive bitstream playback with a frame boundary embodiment is depicted. Block diagram 400 illustrates emulating a FoV update while playback is in place. When the viewpoint changes to 402, the entire 403 frame is downloaded and decoded, besides 404 and 405, even if the viewport lies in the middle of the frame, since the I-frame (401) is located in the beginning of the frame. If the current network bandwidth is less ideal, downloading a new fragment with 8K resolution may cause extra delay. A way to overcome this latency is to have a reduced bitstream segment size for viewport Referring now to FIG. 5, a block diagram 500 of an 8K and 2k immersive bitstream fragmentations with the frame boundary embodiment is depicted. The random-access point period may be reduced to, for example, 10 frames (501-508) for the high-resolution segments in the viewport. The first picture is encode as the I-frame and rest as P frame, and for the low resolution fall back, either only the first picture is encoded as I-frame and the following pictures as P-frames, or a fast random access with unequal random access periods should be defined.

When the random-access period is small, at the time the viewport changes, the client does not have to download all 30 frames, but only 10 frames. Therefore, the delay between the request of new viewport and rendering the new viewport is reduced since the random-access point period is reduced and more number of random access points are now available. A fallback bitstream 509 with a lower bitstream resolution may be provided for less ideal network situation. Of course, this increased efficiency is bought by the coding overhead of the additional random access pictures.

As mention above, downloading intra frame coded pictures may cost more network bandwidth than it is necessary for user's FoV playback and rendering.

When streaming high resolution video, the segmentation may cause delays in bitstream downloading and rendering when network resources are less than ideal. Each segment consist of one or more encoded frames. Changes in viewer's FoV may also cause (additional) delay and degrade user's quality experience (QoE).

Using segments with shorter durations is effective in reducing the M2HQ delay for viewport. Of course, this increased efficiency is bought by the coding overhead of the additional random access pictures since each segment has at least one random access frame.

In an embodiment, as a head-mounted display (HMD) moves, new tiles are requested. As the HMD Speed increases, the M2HQ delay increases as well. This is because the viewport change is very frequent which adds to the delay since a lot of segments which are downloaded and decoded are not rendered. Therefore, the bitstream structure can be defined for the viewport based on the user's head movement.

When the user's viewport does not change, i.e. the HMD is not moving, the bitstream segment duration (i.e. the number of encoded frames in the segment) may be the same as the segments for the low resolution background and for the high resolution tiles in the viewport.

Using a longer duration segment (and therefore a larger segment size) allow the videos to be compressed optimally, thereby reducing the required bandwidth. However, when the bandwidth is not a limitation, a segment with reduced duration and size may be used.

Now, as the user's head move, new HQ tiles are requested. The maximum delay in M2HQ may be defined by the duration of the segment. If the user's orientation does not change or the head moves at a very reduced rate, the bitstream for the viewport may be of longer duration.

A head speed threshold ($H_{TH}$) maybe defined which may be based on the factors like available bandwidth. If the bandwidth is not a limitation, the segment duration/size maybe reduced to decrease the M2HQ delay. The bitstream segment duration/size may be further reduced as the HMD speed increases.

Therefore, the server can encode the segments with variable duration/size based on the real-time transport protocol (RTP) control protocol (RTCP) feedback (which would include the bandwidth information and the HMD speed).

Alternatively, the server can have multiple versions of bitstream with variable segment durations/sizes and based on the RTCP feedback (which would include the bandwidth information and the HMD speed), the bitstream segment size may be defined. Therefore, when a server receives a bitstream request from the user, it may send bitstream segments based on the HMD speed and the available bandwidth.

Figure 6:
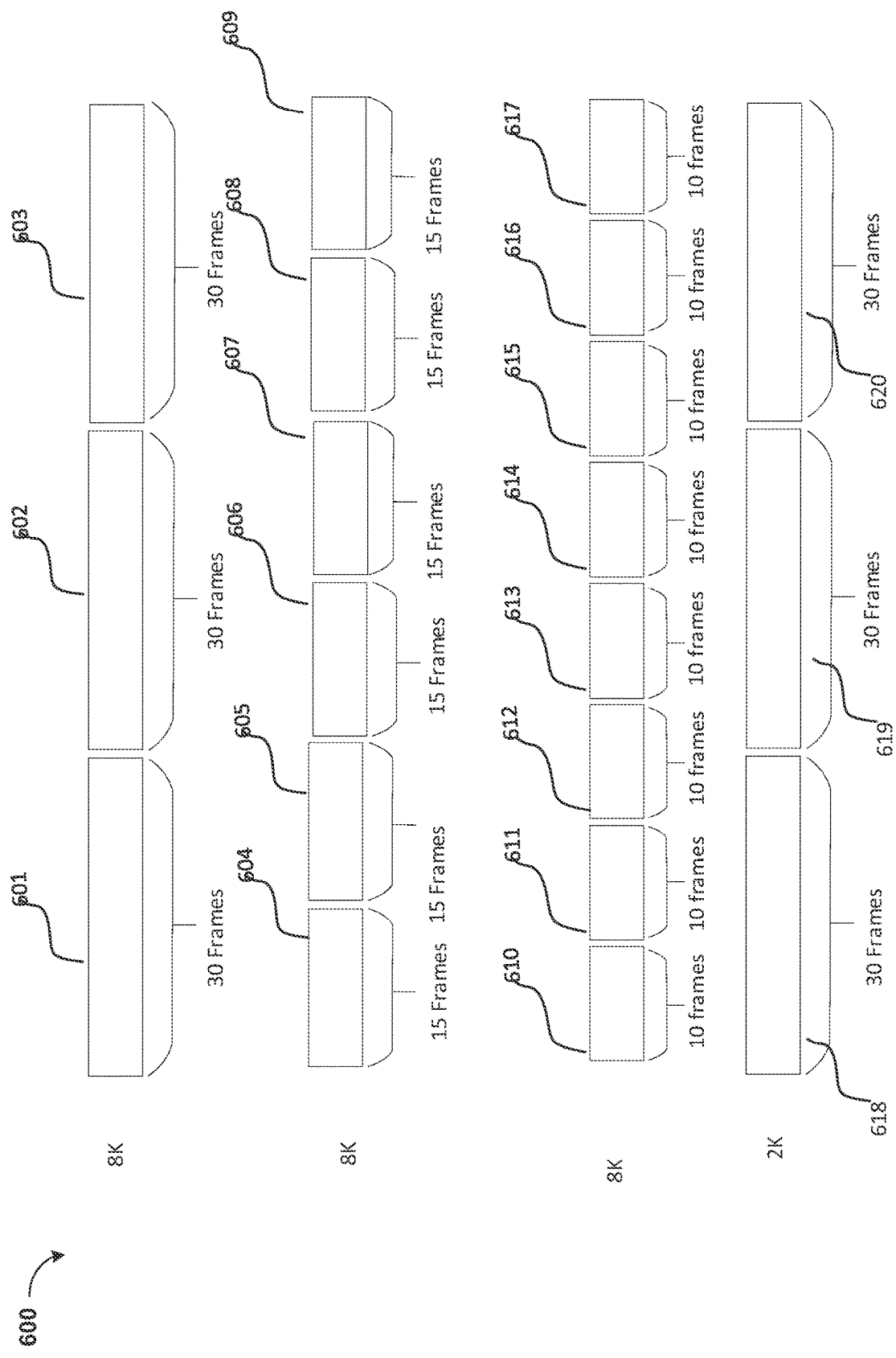
FIG. 6 is a schematic illustration of proposed immersive bitstream fragmentations with the frame boundary embodiment.

Referring now to FIG. 6, where the high quality (8K) viewport bitstream may have multiple bitstream of variable duration/size and one fall back low resolution (2K) for the background with constant segment duration/size.

The sender can define a lowerbound for segment duration ($D_{min}$) due to the bandwidth constrains. Even if the HMD speed increase beyond the corresponding HMD maximum threshold ($H_{MAX}$), the server does not reduce the segment duration from that lower bound.

While the server varies the segment durations in this scheme, it maintains the codec profile/level compliancy requirements to the signaled codec profile and level, therefore the receiver's decoder can decode the segments with no reinitialization.

To minimize the M2HQ delay and enhance the user experience, a receiver may request additional margins at high quality around the viewport when sufficient bandwidth is available. The margin may be of the same quality as the viewport but not necessarily.

In the same or another embodiment, if the HMD movement is within the margin, the new tiles requested (to update the margins) may be of longer duration segment and may not necessarily needs lower segment durations/sizes. This is applicable when the resolution of the margin is same as that of the viewport, i.e. high resolution tiles.

If the resolution of the tile in the margin are lower are compared to the tiles in the viewport, shorter high resolution segments may be requested as the HMD moves even within the margin.

However, if the viewport moves beyond the margin, new shorter duration segments maybe requested to reduce the M2HQ. Optionally, the size of the bitstream segments in the viewport may be download at a reduced segment duration as compared to the segments for the margins.

The sender may signal the use of variable duration segments to the receiver at the session set up using SDP, with optionally one or more of the following parameters: head speed threshold ($H_{TH}$), maximum threshold ($H_{MAX}$), and minimum segment duration ($D_{min}$), so that the receiver includes the head speed in its RTCP reports as well as optimize its segment request based on the optional parameters.

Figure 7:
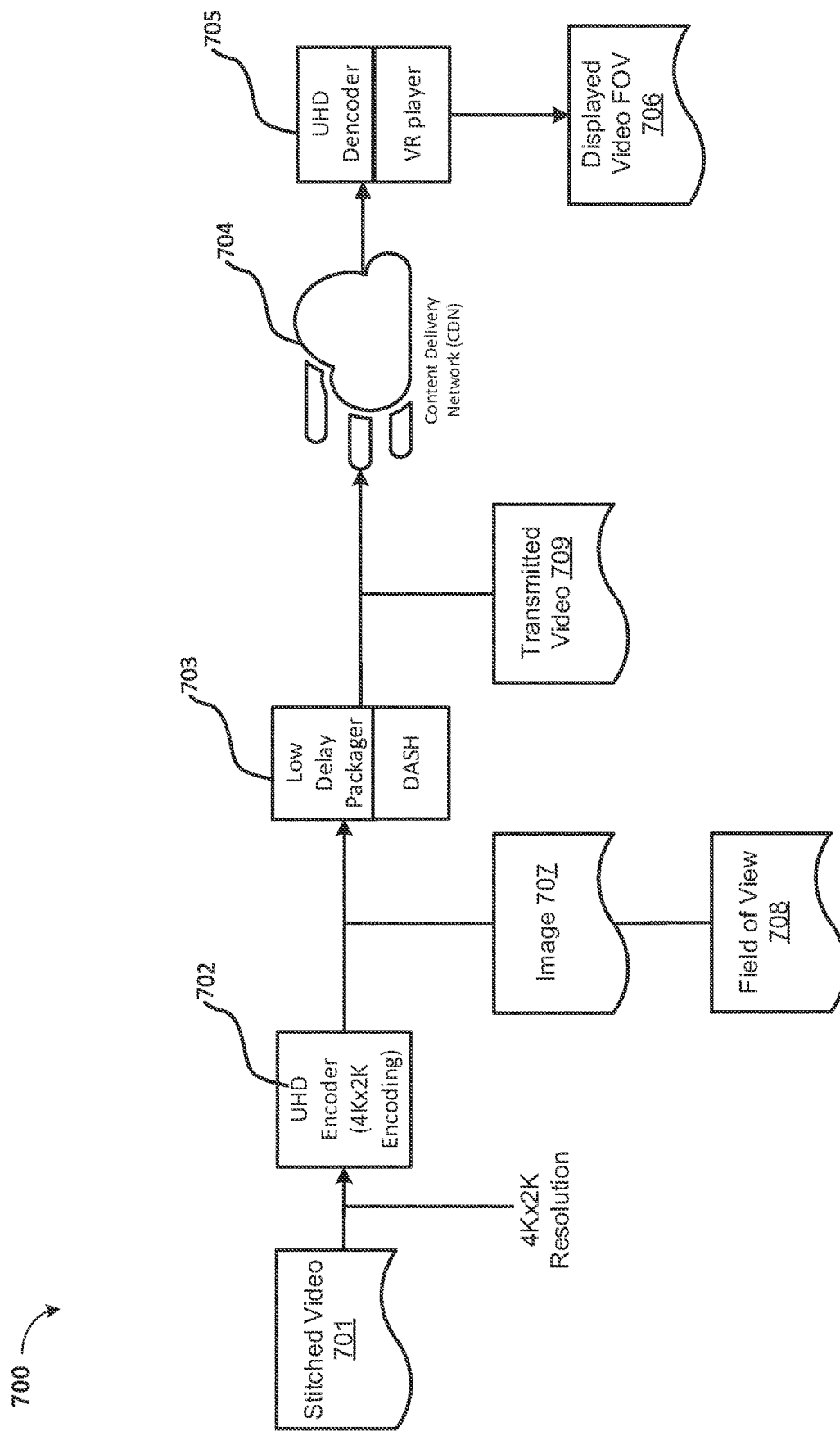
FIG. 7 is a block diagram of a system for viewport bitstream splitting, according to at least one embodiment.

FIG. 7 illustrates the system design as invented. The content after being capture by the camera is stitched into a panoramic representation (701) and is then encoded (702) and passed through a low delay packager (703) where the bitstream is structured with reduced random-access point period. The transmitted video (709) contains high resolution content of the user's FoV (708) and reduced quality for rest of the picture (707). This content is conveyed via CDN (704) to a VR player (705) for rendering (706).

The techniques for bitstream structure for immersive viewport-based video streaming, described above, can be implemented as computer software using computer-readable instructions and physically stored in one or more computer-readable media. For example, FIG. 8 shows a computer system 800 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
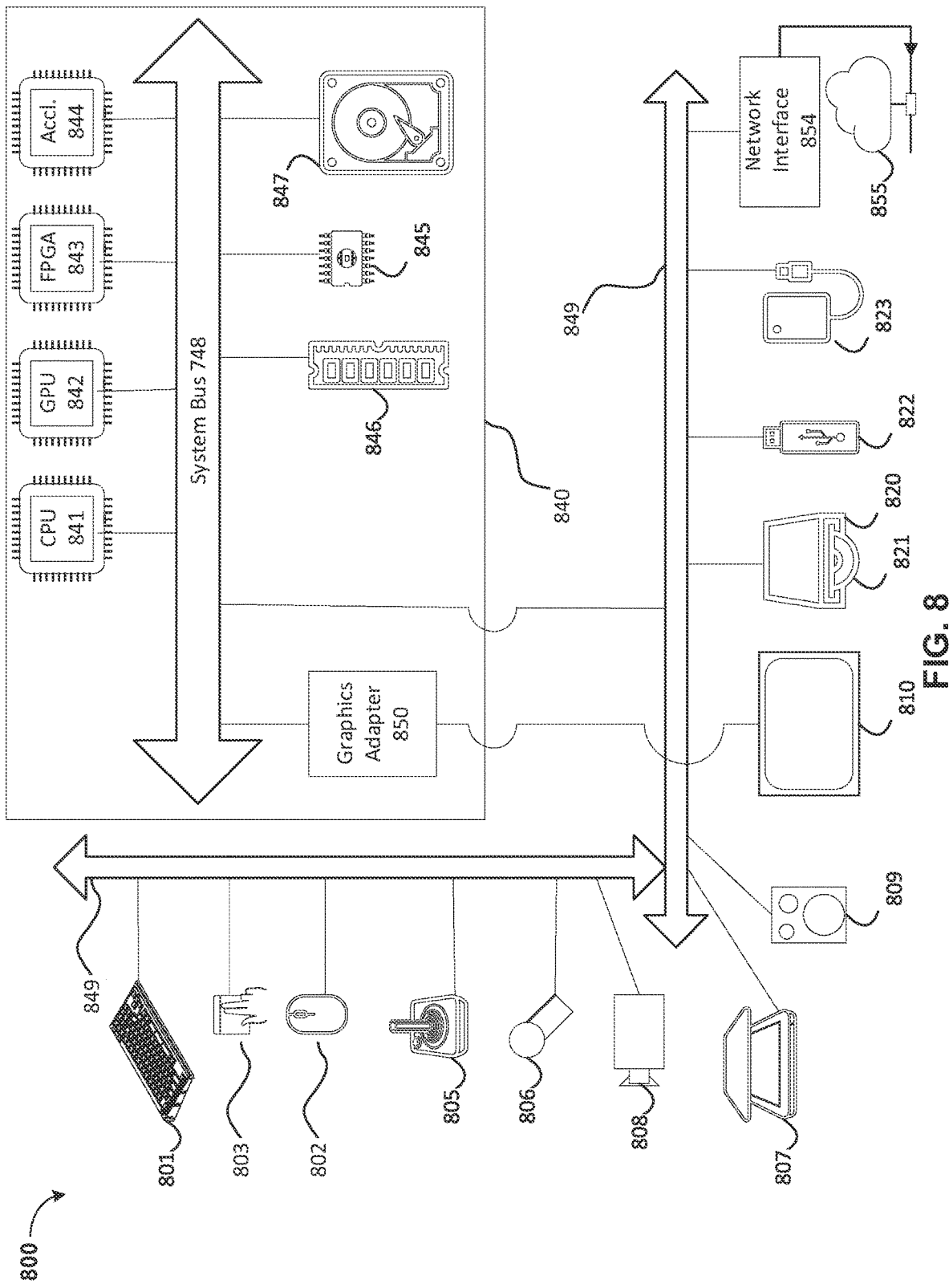
FIG. 8 is a schematic illustration of a computer system, according to at least one embodiment.

The components shown in FIG. 8 for computer system 800 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 800.

Computer system 800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 801, mouse 802, trackpad 803, touch screen 810, data-glove (not depicted), joystick 805, microphone 806, scanner 807, camera 808.

Computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 810, data-glove (not depicted), or joystick 805, but there can also be tactile feedback devices that do not serve as input devices), audio output devices (such as: speakers 809, headphones (not depicted)), visual output devices (such as screens 810 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 800 can also include human accessible storage devices and their associated media such as optical media including CD/DVD ROM/RW 820 with CD/DVD or the like media 821, thumb-drive 822, removable hard drive or solid state drive 823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 800 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (849) (such as, for example USB ports of the computer system 800; others are commonly integrated into the core of the computer system 800 by attachment to a system bus as described below (for example Ethernet interface into a PC computer system or cellular network interface into a smartphone computer system). Using any of these networks, computer system 800 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 840 of the computer system 800.

The core 840 can include one or more Central Processing Units (CPU) 841, Graphics Processing Units (GPU) 842, specialized programmable processing units in the form of Field Programmable Gate Areas (FPGA) 843, hardware accelerators for certain tasks 844, and so forth. These devices, along with Read-only memory (ROM) 845, Random-access memory 846, internal mass storage such as internal non-user accessible hard drives, SSDs, and the like 847, may be connected through a system bus 848. In some computer systems, the system bus 848 can be accessible in the form of one or more physical plugs to enable extensions by additional CPUs, GPU, and the like. The peripheral devices can be attached either directly to the core's system bus 848, or through a peripheral bus 849. Architectures for a peripheral bus include PCI, USB, and the like.

CPUs 841, GPUs 842, FPGAs 843, and accelerators 844 can execute certain instructions that, in combination, can make up the aforementioned computer code. That computer code can be stored in ROM 845 or RAM 846. Transitional data can be also be stored in RAM 846, whereas permanent data can be stored for example, in the internal mass storage 847. Fast storage and retrieve to any of the memory devices can be enabled through the use of cache memory, that can be closely associated with one or more CPU 841, GPU 842, mass storage 847, ROM 845, RAM 846, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 800, and specifically the core 840 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 840 that are of non-transitory nature, such as core-internal mass storage 847 or ROM 845. The software implementing various embodiments of the present disclosure can be stored in such devices and executed by core 840. A computer-readable medium can include one or more memory devices or chips, according to particular needs. The software can cause the core 840 and specifically the processors therein (including CPU, GPU, FPGA, and the like) to execute particular processes or particular parts of particular processes described herein, including defining data structures stored in RAM 846 and modifying such data structures according to the processes defined by the software. In addition or as an alternative, the computer system can provide functionality as a result of logic hardwired or otherwise embodied in a circuit (for example: accelerator 844), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Figure 9:
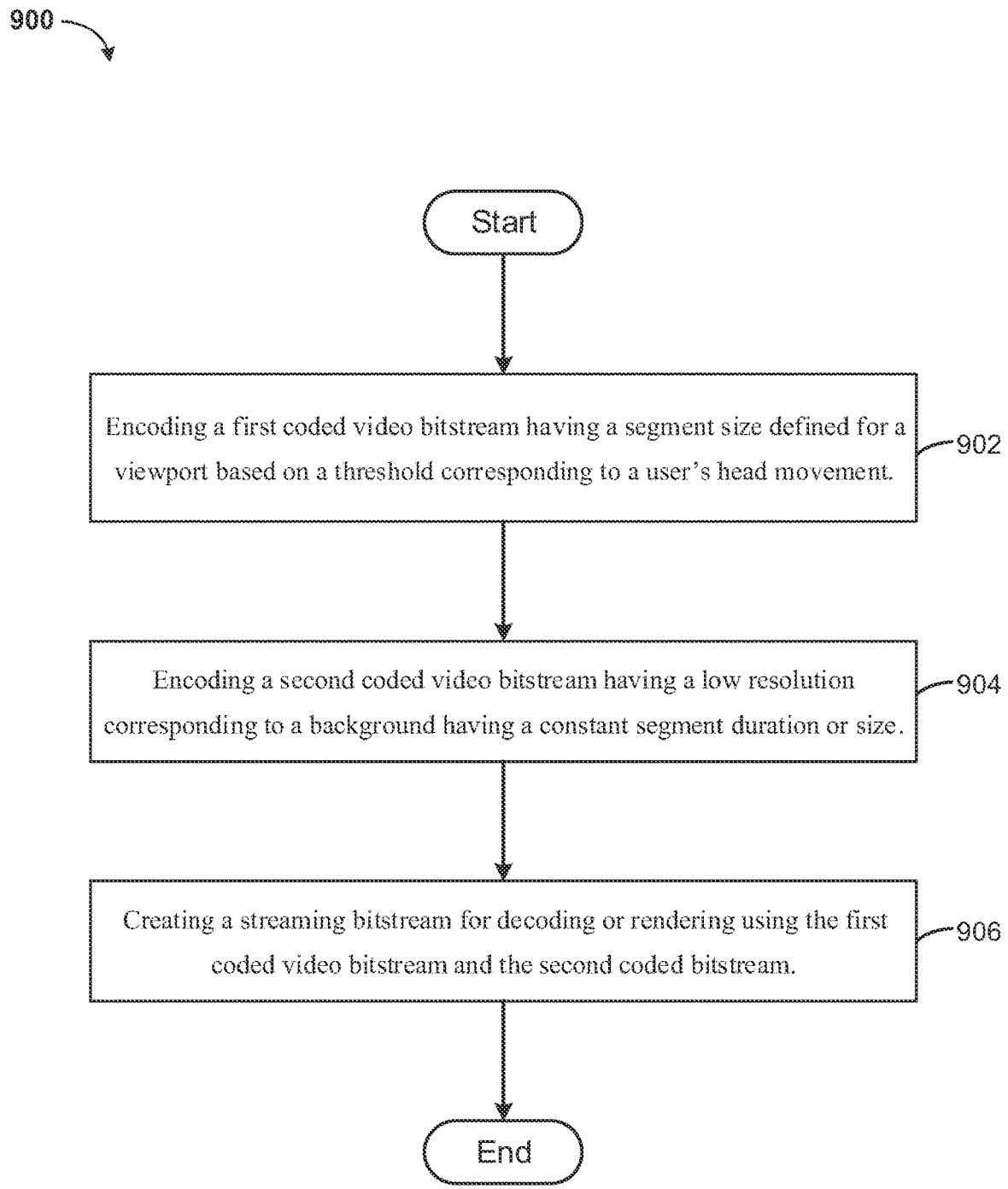
FIG. 9 is an operational flowchart illustrating the steps carried out by a program for viewport bitstream splitting, according to at least one embodiment.

Referring now to FIG. 9, an operational flowchart illustrating the steps of a method 900 carried out by a program for splitting viewport bitstreams is depicted.

At 902, the method 900 may include encoding a first coded video bitstream having a segment size defined for a viewport based on a threshold corresponding to a user's head movement.

At 904, the method 900 may include encoding a second coded video bitstream having a low resolution corresponding to a background having a constant segment duration or size.

At 906, the method 900 may include creating a streaming bitstream for decoding or rendering using the first coded video bitstream and the second coded bitstream.

It may be appreciated that FIG. 9 provides only an illustration of one implementation and does not imply any limitations with regard to how different embodiments may be implemented. Many modifications to the depicted environments may be made based on design and implementation requirements.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of decoding viewport bitstreams, executable by a processor, comprising:
    receiving, over a content delivery network (CDN), first video content;
    decoding the first video content;
    transmitting, to a video encoder, information about (i) a speed of a user's head movement while viewing the first video content via a user wearable device and (ii) an available bandwidth;
    receiving, from the video encoder based on the transmitted information, a streaming bitstream that includes (i) a first coded video bitstream having a segment size defined for a viewport based on the available bandwidth, a minimum segment duration, and a head speed threshold corresponding to the speed of the user's head movement such that the segment size is inversely proportional to the speed of the user's head movement and is not smaller than the minimum segment duration, the first coded video bitstream having a first resolution, and (ii) a second coded video bitstream having a second resolution corresponding to a background having a constant segment duration or size, the second resolution being lower than the first resolution; and
    rendering second video content using the first coded video bitstream and the second coded video bitstream.

2. The method of claim 1, wherein the first coded video bitstream has multiple segment sizes for the viewport.

3. The method of claim 1, wherein the head speed threshold is dependent on the speed of the user's head movement and the available bandwidth.

4. The method of claim 3, wherein the transmitting the information about the speed of the user's head movement and the available bandwidth is via a real time transport protocol (RTP) control protocol (RTCP) feedback.

5. The method of claim 1, wherein a margin around the viewport is requested at the same or longer segment size as the viewport.

6. The method of claim 5, wherein based on the user's head movement being within the margin, new tiles having a longer segment are requested for updating the margin.

7. The method of claim 5, wherein shorter segments having the first resolution are requested based on a resolution of tiles in the margin being lower than tiles in the viewport.

8. The method of claim 7, wherein the shorter segments are requested regardless of whether the user's head movement is within the margin.

9. The method of claim 5, wherein shorter length segments are requested based on the viewport moving beyond the margin.

10. A decoder for decoding viewport bitstreams, the decoder comprising:
one or more computer-readable non-transitory storage media configured to store computer program code; and
one or more computer processors configured to access said computer program code and operate as instructed by said computer program code, said computer program code including:
first receiving code configured to cause the one or more computer processors to receive, over a content delivery network (CDN), first video content;
decoding code configured to cause the one or more computer processors to decode the first video content;
transmitting code configured to cause the one or more computer processors to transmit, to a video encoder, information about (i) a speed of a user's head movement while viewing video content via a user wearable device and (ii) an available bandwidth;
second receiving code configured to cause the one or more computer processors to receive, from the video encoder based on the transmitted information, a streaming bitstream that includes (i) a first coded video bitstream having a segment size defined for a viewport based on the available bandwidth, a minimum segment duration, and a head speed threshold corresponding to the speed of the user's head movement such that the segment size is inversely proportional to the speed of the user's head movement and is not smaller than the minimum segment duration, the first coded video bitstream having a first resolution, and (ii) a second coded video bitstream having a second resolution corresponding to a background having a constant segment duration or size, the second resolution being lower than the first resolution; and
rendering code configured to cause the one or more computer processors to render second video content using the first coded video bitstream and the second coded video bitstream.

11. The decoder of claim 10, wherein the first coded video bitstream has multiple segment sizes for the viewport.

12. The decoder of claim 10, wherein the head speed threshold is dependent on the speed of the user's head movement and the available bandwidth.

13. The decoder of claim 12, wherein the information about the speed of the user's head movement and the available bandwidth is transmitted via a real-time transport protocol (RTP) control protocol (RTCP) feedback.

14. The decoder of claim 10, wherein a margin around the viewport is requested at the same or longer segment size as the viewport.

15. The decoder of claim 14, wherein based on the user's head movement being within the margin, new tiles having a longer segment are requested for updating the margin.

16. The decoder of claim 14, wherein shorter segments having the first resolution are requested based on a resolution of tiles in the margin being lower than tiles in the viewport.

17. The decoder of claim 16, wherein the shorter segments are requested regardless of whether the user's head movement is within the margin.

18. The decoder of claim 14, wherein shorter length segments are requested based on the viewport moving beyond the margin.

19. A non-transitory computer readable medium having stored thereon a computer program for decoding viewport bitstreams, the computer program configured to cause one or more computer processors to:
receive, over a content delivery network (CDN), first video content;
decode the first video content;
transmit, to a video encoder, information about (i) a speed of a user's head movement while viewing the first video content via a user wearable device and (ii) an available bandwidth;
receive, from the video encoder based on the transmitted information, a streaming bitstream that includes (i) a first coded video bitstream having a segment size defined for a viewport based on the available bandwidth, a minimum segment duration, and a head speed threshold corresponding to the speed of the user's head movement such that the segment size is inversely proportional to the speed of the user's head movement and is not smaller than the minimum segment duration, the first coded video bitstream having a first resolution, and (ii) a second coded video bitstream having a second resolution corresponding to a background having a constant segment duration or size, the second resolution being lower than the first resolution; and
render second video content using the first coded video bitstream and the second coded video bitstream.

20. The computer readable medium of claim 19, wherein a margin around the viewport is requested at the same or longer segment size as the viewport.

* * * * *